(12) United States Patent
Petty, II et al.

(10) Patent No.: US 12,618,197 B2
(45) Date of Patent: May 5, 2026

(54) ADDITIVE COMPOSITIONS FOR PAPERMAKING

(71) Applicant: SOLENIS TECHNOLOGIES, L.P., Wilmington, DE (US)

(72) Inventors: Anthony Joseph Petty, II, Glen Mills, PA (US); Sachin Borkar, Wilmington, DE (US); Suboh Abdallah, Philadelphia, PA (US); Matthew Wright, Weddington, NC (US)

(73) Assignee: Solenis Technologies, L.P., Wilmington, DE (US)

( * ) Notice: Subject to any disclaimer, the term of this patent is extended or adjusted under 35 U.S.C. 154(b) by 375 days.

(21) Appl. No.: 18/156,476

(22) Filed: Jan. 19, 2023

(65) Prior Publication Data

US 2023/0235509 A1     Jul. 27, 2023

Related U.S. Application Data

(60) Provisional application No. 63/301,996, filed on Jan. 21, 2022.

(51) Int. Cl.
| | |
|---|---|
| *C08L 33/26* | (2006.01) |
| *D21H 17/19* | (2006.01) |
| *D21H 17/45* | (2006.01) |

(52) U.S. Cl.
CPC ............ *D21H 17/455* (2013.01); *C08L 33/26* (2013.01); *D21H 17/19* (2013.01)

(58) Field of Classification Search
CPC .................................................... C08J 220/56
See application file for complete search history.

(56) References Cited

U.S. PATENT DOCUMENTS

| | | | |
|---|---|---|---|
| 7,897,013 | B2 | 3/2011 | Hagiopol et al. |
| 8,222,343 | B2 | 7/2012 | Wright |

| | | | | |
|---|---|---|---|---|
| 8,288,502 | B2 | 10/2012 | Bode et al. | |
| 8,920,606 | B2 * | 12/2014 | Wright ................ | D21H 17/375 |
| | | | | 525/154 |
| 9,080,288 | B2 * | 7/2015 | Hietaniemi ............ | C08K 3/013 |
| 9,567,708 | B2 | 2/2017 | Cheng et al. | |
| 2012/0247699 | A1 | 10/2012 | Wright | |
| 2015/0204019 | A1 | 7/2015 | Wright | |
| 2016/0201269 | A1 | 7/2016 | Wright | |
| 2017/0247489 | A1 | 8/2017 | Tekobo et al. | |
| 2023/0140638 | A1 * | 5/2023 | Lu .......................... | D21H 11/14 |
| | | | | 162/164.6 |
| 2024/0218603 | A1 | 7/2024 | Sealey, II et al. | |

FOREIGN PATENT DOCUMENTS

| | | | | |
|---|---|---|---|---|
| WO | 2021186109 | A1 | 9/2021 | |
| WO | WO-2021188705 | A1 * | 9/2021 | ............ C08F 220/56 |

OTHER PUBLICATIONS

ISA/US, International Search Report and Written Opinion issued in int. Appl. No. PCT/US2023/060961 mailed Jun. 26, 2023.

* cited by examiner

*Primary Examiner* — Margaret G Moore
(74) *Attorney, Agent, or Firm* — Ingrassia Fisher & Lorenz LLP

(57) ABSTRACT

A drainage-optimized additive composition for papermaking is disclosed. The composition comprises an aqueous media and a glyoxalated polyacrylamide (gPAM) resin having a weight average molecular weight (Mw) of at least about 5 MDa. The composition comprises from about 1.95 to about 2.45 wt. % of the gPAM resin. A method of preparing the composition is also disclosed, and comprises preparing a cationic acrylamide (cAM) prepolymer having at least one predetermined property, and selectively glyoxalating the cAM prepolymer by controlling the concentration of the cAM prepolymer in the aqueous media during glyoxalation in relation to the predetermined property. The method may be carried out in situ during a papermaking process (i.e., as an on-site method). A process of forming paper with the composition also disclosed, and comprises combining the composition with the aqueous suspension of cellulosic fibers, forming the cellulosic fibers into a sheet, and drying the sheet to produce a paper.

20 Claims, No Drawings

ADDITIVE COMPOSITIONS FOR PAPERMAKING

CROSS-REFERENCE TO RELATED APPLICATION

This application claims priority to and all benefits of U.S. Provisional Application No. 63/301,996, filed Jan. 21, 2022, the content of which is incorporated herein by reference.

FIELD OF THE DISCLOSURE

The present disclosure relates generally to additive compounds and compositions for papermaking and, more specifically, to high-charge high-molecular weight glyoxalated polyacrylamide (gPAM) resins and methods of making and using the same.

BACKGROUND

Papermaking is a complex process in which paper is prepared from pulp (e.g. wood), water, filler, and various chemicals. Paper manufacturing is among the most water intensive industries, as the processes include numerous stages reliant on substantial amounts of water and aqueous solutions being added to the cellulosic fibers (i.e., the "inflow stream") to give a furnish, and eventually separated from the furnish (i.e., the "effluent stream") to give the final product. In the course of a typical papermaking process, a relatively concentrated aqueous slurry of cellulosic material (i.e., "thick stock") is diluted by addition of water to give a relatively diluted slurry of cellulosic material (i.e., "thin stock"), which is used to prepare a paper web that must be dewatered to give the final product. Throughout the papermaking process, various chemical additives are employed to improve particular properties of the process (i.e., "process aids") and/or the final product being prepared (i.e., "functional aids"). Examples of processes aids include defoamers and antifoams, retention aids, biocides, drainage aids, formation aids, etc. Examples of functional additives include strength aids, e.g. for imparting temporary wet-strength (TWS), wet-strength (WS), and/or dry-strength (DS) to the final product.

In view of the number and complexity of required stages in a given papermaking process, and the number and amounts of additives utilized in each stage, there is increasing demand for additives that provide both process and functional improvements to a given processes. Unfortunately, however, achieving some sought after improvements may lead to a decrease in other performance factors. For example, achieving high retention, which can lead to improvements in the strength of the final product, can lead to reduced drainage and formation. Using conventional high molecular weight drainage aids can dive excellent drainage and retention, but offer little to no strength benefits, and in some instances even result in a reduced strength due to over-flocculation. Certain DS aids like polyamidoepichlorohydrins (PAE) can give excellent dry strength, but offer little to no drainage benefits and have limited repulpability. Complicating matters further, the efficiency of any given solution is strongly furnish dependent, with some of the best known dry strength and/or drainage aids failing under desired conditions, e.g. due to fines content, lignin content, and/or conductivity of the furnish system. As such, while there are programs to address these furnish derived performance reductions, there is a still present need for additives that provide exceptional dewatering and good dry strength in even the most challenging furnish systems.

One category of chemicals being increasingly explored for multi-use additive application includes glyoxalated polyacrylamide (gPAM) resins, which have been utilized in the paper industry for many years as processes aids, e.g. for improving water drainage during the papermaking process, and also as functional additives, e.g. for imparting temporary wet-strength (TWS), wet-strength (WS), and dry-strength (DS) to the final paper(s) being prepared. Typical gPAM resins are prepared by glyoxalating polyacrylamides (PAM), i.e., by reacting glyoxal with a PAM or PAM copolymer, such as those prepared from acrylamide (AM) and various anionic or cationic monomers. As but one example, diallyldimethylammonium chloride (DADMAC) is a cationic monomer utilized to prepare poly(AM/DADMAC) copolymers, which may be used as a prepolymer in a glyoxalation reaction to give the corresponding gPAM resins (i.e., glyoxalated poly(AM/DADMAC)). Unfortunately, conventional gPAM resins suffer from numerous drawbacks associated with production, storage, and use. For example, while many commercial gPAM resins are known to perform as exceptional strength aids, such resins typically underperform in difficult furnishes, especially with respect to dewatering and drainage.

BRIEF SUMMARY

A drainage-optimized additive composition for papermaking is provided. The additive composition comprises an aqueous media and a glyoxalated polyacrylamide (gPAM) resin having a weight average molecular weight (Mw) of at least about 5 MDa. The additive composition comprises from about 1.95 to about 2.45 wt. % of the gPAM resin, and may be prepared in situ during a papermaking process (i.e., as an on-site gPAM resin).

A method of preparing the additive composition (the "preparation method") is also provided, and comprises preparing a cationic acrylamide (cAM) prepolymer, and selectively glyoxalating the cAM prepolymer in the aqueous media to give the gPAM resin, thereby preparing the additive composition. The cAM prepolymer has at least one predetermined physical property selected from cationic monomer content, reduced solution viscosity (RSV), charge density, and zeta potential, and selectively glyoxalating the cAM prepolymer comprises controlling the concentration of the cAM prepolymer in the aqueous media during glyoxalation in relation to the at least one predetermined physical property. The preparation method may be carried out in situ during a papermaking process (i.e., as an on-site method).

A process of forming paper with the additive composition (the "process") is also provided. The process comprises: (1) providing an aqueous suspension of cellulosic fibers; (2) combining the additive composition with the aqueous suspension or preparing the additive composition in the presence of the aqueous suspension; (3) forming the cellulosic fibers into a sheet; and (4) drying the sheet to produce a paper. The process may exhibit a drainage rate exhibited during (3)-(4) reduced by at least about 20% compared to a substantially similar process that is substantially free from the additive composition.

DETAILED DESCRIPTION

The following detailed description is merely exemplary in nature and is not intended to limit the instant composition or method. Furthermore, there is no intention to be bound by any theory presented in the preceding background or the following detailed description. Conventional techniques related to the compositions, methods, processes, and portions thereof set forth in the embodiments herein may not be described in detail for the sake of brevity. Various tasks and process steps described herein may be incorporated into a more comprehensive procedure or process having additional steps or functionality not described in detail herein for being well-known and readily appreciated by those of skill in the art. As such, in the interest of brevity, such conventional steps may only be mentioned briefly or will be omitted entirely without providing well-known process details.

A drainage-optimized additive composition is provided, along with a method of preparing and a process for using the same. The additive composition is useful in providing a functionalized polymer to production processes to provide process and/or product improvements based on the propertied of the functionalized polymer. Specifically, the additive composition comprises a glyoxalated polyacrylamide (gPAM) resin and aqueous media. The gPAM resin has high zeta potential and a high-molecular weight, which may be selectively tailored via the method provided herein. The gPAM resin provides excellent drainage to difficult furnishes and good dry strength to products, and thus the additive composition may be utilized in papermaking processes to provide improvements and advantageous thereto.

As described and demonstrated in the embodiments and examples herein, it has been surprisingly discovered that the gPAM resin of the additive composition can be prepared with a high weight average molecular weight (Mw) and zeta potential via the method described below. Compared to conventional techniques, the method of the present embodiments decouples the Mw and/or charge of the product gPAM resin from the Mw and/or charge of the prepolymer utilized in to prepare the gPAM resin. As such, the additive composition can provide improved functionality and performance by providing the gPAM resin with selectively prepared Mw and charge, without the drawbacks or deficiencies associated with conventional techniques relying on prepolymer properties for performance.

The additive composition comprises the gPAM resin and the aqueous media. The aqueous media is not particularly limited, and may comprise, alternatively may be, any aqueous composition compatible with the gPAM resin and/or the components used to prepare the same. In this fashion, the aqueous media may be a water-based solution or suspension, optionally including additional components, such as process water from a papermaking operation, or simply an aqueous carrier vehicle used in the preparation of the gPAM resin.

Typically, the additive composition comprises the gPAM resin in the aqueous media in functional amount, i.e., in a solids content that maximizes the amount of gPAM resin while maintaining a useful flowable state of the composition. In this sense, the gPAM resin may be present in an amount of from greater than 0 wt. % to less than the gel point of the gPAM resin in the aqueous media. In some embodiments, the gPAM resin is present in an amount of from about 1.2 to about 6%, such as from about 1.2 to about 5, alternatively from about 1.3 to about 4, alternatively from about 1.4 to about 3, alternatively from about 1.95 to about 2.45% based on the aqueous media (i.e., as % solids). However, as will be appreciated from the method below, the amount of gPAM present in the composition may be dependent on the amount of prepolymer utilized in the method.

The gPAM resin typically has a Mw of at least about 5 megadaltons (MDa). In certain embodiments, the gPAM resin has a Mw of at least about 6 MDa, alternatively at least about 6.5, alternatively at least about 7, alternatively at least about 7.5 MDa. The range of Mw is not particularly limited above the bottom values of these ranges noted (i.e., about 5 MDa or above, alternatively about 5.5 MDa or above, etc.). As such, the gPAM resin may have a Mw in the range of from 5 to 50 MDa, such as from 5 to 40, alternatively from 5 to 35, alternatively from 5 to 30 MDa. In specific embodiments, the gPAM resin may have a Mw higher than those listed in the aforementioned ranges. Such gPAM resins may be achieved and provide the benefits of the additive composition disclosed herein. The particular Mw can be selected by one of skill in the art in view of the embodiments shown and described herein, e.g. in view of a desired use or particular application of the additive composition being targeted.

The gPAM resin typically has a zeta potential of from about 10 to about 30 mV, at pH 7. In some embodiments, the gPAM resin has a zeta potential of from about 15 to about 30 mV, such as from about 15 to about 30, alternatively from about 20 to about 30, alternatively from about 22 to about 30, alternatively from about 22 to about 27 mV, at pH 7.

The gPAM resin typically has a radius of gyration (Rg) of at least about 100 nm. In some embodiments, the gPAM resin has a Rg of at least about 20 nm, such as at least about 140, alternatively at least about 150, alternatively at least about 160, alternatively at least about 170 nm.

The gPAM resin typically has a charge density of from about 0.2 to about 3 mEq./g, at pH 7. In some embodiments, the gPAM resin has a charge density of from about 1 to about 3, mEq./g, at pH 7.

The particular properties and features of the gPAM resin, including those introduced above, will be appreciated in view of the method and components utilized in the preparation method set forth herein.

In general, the method of preparing the additive composition comprises preparing the gPAM resin in the aqueous media, or in another aqueous media which is formulated into the final additive composition. As such, the preparation of the gPAM resin described in detail herein may be used in addition to or in place of conventional processes known in the art.

Preparing the gPAM resin comprises glyoxalating a cationic acrylamide (cAM) prepolymer, i.e., reacting glyoxal with a cAM prepolymer.

The cAM prepolymer may be prepared or obtained. In some embodiments, the method comprises preparing the cAM prepolymer. For example, the preparation may comprise reacting an acrylamide (AM) monomer, a cationic monomer, and optionally one or more additional ethylenically unsaturated monomer(s), in the presence of a chain transfer agent. However, there are multiple methods to prepare the cAM prepolymer, which are known in the art and may be adapted from conventional methods of preparing prepolymers suitable for glyoxalation to give a GPAM resin. Examples include free radical polymerization in water, such as via use of a redox initiating system (e.g. sodium metabisulfite and sodium persulfate). Other combinations of redox initiating systems for initiating polymerization of suitable comonomers may also be used, including other persulfate salts such as potassium persulfate or ammonium persulfate or other components such as potassium bromate. Such redox initiating systems may be used in combination with a chain transfer agent, such as a sodium hypophosphite, sodium formate, isopropanol, or mercapto compound-based chain transfer agent.

The cAM prepolymer typically includes ionic repeat units, e.g. cationic repeat units derived from the cationic monomer. The cationic comonomer may be any cationic monomer capable of reacting through radical chain polymerization with the AM monomer and/or other monomers/comonomers to form the cAM prepolymer.

Examples of cationic monomers include tertiary and quaternary diallyl amino derivatives, or tertiary and quaternary amino derivatives of acrylic acid or (meth)acrylic acid or acrylamide or (meth)acrylamide, vinylpyridines and quaternary vinylpyridines, or para-styrene derivatives containing tertiary or quaternary aminoderivatives. Cationic comonomers may be chosen from diallyldimethylammonium chloride (DADMAC), [2-(acrylamido)ethyl]trimethylammonium chloride, [2-(methacrylamido)ethyl]trimethylammonium chloride, [3-(acrylamido)propyl]trimethyl ammonium chloride, [3-(methacrylamido)propyl]trimethyl ammonium chloride, N-methyl-2-vinylpyridinium N-methyl-4-vinylpyridinium, p-vinylphenyltrimethylammonium chloride, p-vinylbenzyltrimethylammonium chloride, [2-(acryloyloxy)ethyl]trimethylammonium chloride, [2-(methacryloyloxy)ethyl]trimethylammonium chloride, [3-(acryloyloxy)propyl]trimethyl ammonium chloride, [3-(methacryloyloxy)propyl]trimethylammonium chloride, and combinations thereof. It is understood that mixtures of cationic comonomers can be used to the same purpose. In some embodiments, the cationic monomer includes diallyldimethylammonium chloride (DADMAC).

The cationic acrylamide prepolymer may contain other monomer units provided in by additional ethylenically unsaturated monomer(s) in the polymerization. These monomers are typically selected to not significantly interfere with the glyoxalation process. For example, additional monomer units can be acrylates or alkyl acrylates (e.g. methacrylates, methyl methacrylate, etc.), styrene, vinyl acetates, or alkyl acrylates Polymerization is typically carried out in an aqueous solution (e.g. in the aqueous media) at a temperature of at least about 50° C. It is sometimes advantageous to raise the temperature after the addition of all comonomers has been completed so as to reduce the level of residual monomers in the product. The pH during the reaction may be adjusted with acids or bases or with a buffer, and can be dependent on the initiator system and components used in the reaction.

Comonomers may be added all at once or added over any length of time. If one monomer is less reactive than another, then it is advantageous to add part or all of the slower reacting monomer at the start of the polymerization, followed by a slow continuous or multiple batch wise additions of more reactive monomer. Adjusting feed rates can lead to more uniformity of the compositions of polymer chains. Likewise, initiators may be added at once or added over any length of time. To reduce the amount of residual monomer in the copolymer, is often advantageous to continue adding the initiator system for some time after all monomers have been added, or to introduce batch wise additional amounts of initiator. Controlling polymer compositional and molecular weight uniformity by controlling addition times is well known in the polymer industry.

In some embodiments, the cAM prepolymer is prepared with at least one predetermined physical property, such as cationic monomer content, reduced solution viscosity (RSV), charge density, and/or zeta potential.

For example, the cAM prepolymer typically comprises from about 2 to about 30 mol % of cationic monomer units derived from the cationic monomer. In some embodiments, the cAM prepolymer comprises from about 8 to about 30, alternatively from about 10 to about 30, alternatively from about 12 to about 25 mol % of cationic monomer units.

In these or other embodiments, the cAM prepolymer typically has a RSV of from about 0.5 to about 1.8 dL/g, such as from about 0.6 to about 1.6 dL/g. In these or other embodiments, the cAM prepolymer typically has a zeta potential of from about 10 to about 30 mV, at pH 7; In some embodiments, the cAM prepolymer has a zeta potential of from about 15 to about 30 mV, such as from about 15 to about 30, alternatively from about 20 to about 30, alternatively from about 20 to about 25 mV, at pH 7. In these or other embodiments, the cAM prepolymer typically has a charge density of from about 0.2 to about 3 mEq./g, such as from about 1 to about 3, mEq./g, at pH 7.

The method further comprises glyoxalating cAM prepolymer, i.e., reacting the cAM prepolymer with glyoxal. As demonstrated in the Examples herein, the method may be used to selectively glyoxalate the cAM prepolymer by controlling the concentration of the cAM prepolymer in an aqueous media during glyoxalation. In this fashion, it has been found that the gPAM resin having a high Mw can thus be prepared, decoupled from the Mw of the cAM prepolymer.

As understood in the art, the reaction the cAM prepolymer with glyoxal may be carried out under varied conditions of time, temperature, pH, etc. Typically, the glyoxal is added quickly to the cAM prepolymer to minimize crosslinking. Alternatively, the cAM prepolymer can be added to the glyoxal. It is also generally understood in the art that the molecular weight of the cAM prepolymer, and the ratio of glyoxal to acrylamide groups on the cAM prepolymer, may be adjusted to achieve desired levels of crosslinking and viscosity build during a glyoxalation process The cAM prepolymer and the glyoxal are typically reacted in a dry weight (w/w) ratio of from about 75:25 to about 95:5 (A):(B), such as from about 80:20 to about 90:10. The residual level of glyoxal of the final gPAM resin is typically below about 10%, alternatively below about 8%, alternatively below about 5%, on a dry weight basis of the gPAM resin.

The concentration of the cAM prepolymer is selectively controlled to give the high-Mw gPAM resin. For example, in some embodiments, the cAM prepolymer is present in the aqueous media at an initial concentration of from about 0.9 to about 5.7%, alternatively from about 1.65 to about 2.15%. This concentration is typically defined in terms of solids, i.e., the weight percent concentration of the starting cAM prepolymer at the start of the glyoxalation reaction, that is when all of the glyoxal has been added. In such embodiments, the gPAM resin may be prepared in the aqueous media at a solids content (%) of about X+Y, where X is the initial concentration of the cAM prepolymer in the aqueous media utilized in the glyoxalation, and Y is a conversion factor based on one or more of the predetermined physical properties of the cAM prepolymer or a parameter of the glyoxalation reaction itself. For example, as demonstrated in the examples, in embodiments where the cAM prepolymer is utilized in a concentration of from about 1.6 to about 2.2, the conversion factor Y is about 0.3. As such, a cAM prepolymer concentration of about 1.8 can be used to achieve a solids content of the gPAM resin in the aqueous media of about 2.1. In this fashion, the solids content of the cAM prepolymer and the solids content of the gPAM resin may be described in view of each other. Likewise, selective glyoxalation may be understood to include selecting a desired cAM prepolymer concentration based on a desired gPAM resin solids content in the additive composition.

The gPAM resins may be adjusted to a pH of about 3 after glyoxalation reaction to improve storage stability until they are used, or may be used directly without further adjustment.

It has been surprisingly found that the method prepares the gPAM resin in a highly-conservative fashion with respect to the zeta potential and charge density of the cAM prepolymer utilized. For example, in typical embodiments, the gPAM resin has a zeta potential within about 10%, alternatively within about 7.5%, alternatively within about 5% of the zeta potential of the cAM prepolymer. In these or other embodiments, the gPAM resin has a charge density within about 10%, alternatively within about 7.5%, alternatively within about 5% of the charge density of the cAM prepolymer.

The additive composition may be used to make paper, which comprises pulp and the gPAM resin. The additive composition used in paper making may lead to beneficial properties, such as, e.g. improved dry strength, temporary wet-strength, permanent wet-strength, wet-strength decay, etc., compared to the same properties when a conventional gPAM resin (i.e., of relatively-low Mw) is used.

In the paper making process there are multiple steps, generally including: forming an aqueous suspension of cellulosic fibers; addition of additives (e.g. the additive composition) to the suspension; forming a sheet from the fibers; and drying the sheet to give the paper. Additional steps may also be employed (e.g. for tissue and towel grades, a forth step of creping or forming a structure of the paper to provide properties such as softness is typically employed). These steps and variations of the process are known to those skilled in the art.

In view of the above, a process of forming paper is also provided herein. The process generally comprises:

(1) providing an aqueous suspension of cellulosic fibers;

(2) combining the additive composition with the aqueous suspension, wherein:

(3) forming the cellulosic fibers into a sheet; and (4) drying the sheet to produce a paper.

The additive composition may be prepared and subsequently combined with a pre-formed aqueous suspension of cellulosic fibers. For example, the gPAM resin may be prepared and introduced to the suspension within a time period suitable for storage, such as within about 10, alternatively about 8, alternatively about 5 hours after glyoxalation. Alternatively, the additive composition may be prepared in the aqueous suspension, i.e., where the gPAM resin is prepared in-situ with the aqueous suspension. Such processes are known in the art as "on-site" processes, and are particularly suitable for use in the present embodiments.

As introduced above, the paper making process may further comprise steps of drying, patterning, treating, and creping the paper to form a finished paper product. Finished paper products can include, but are not limited to, bath tissue, facial tissue, and paper towels, which are also contemplated herein.

EXAMPLES

The following examples, illustrating embodiments of this disclosure, are intended to illustrate and not to limit the invention. Unless otherwise noted, all solvents, substrates, and reagents are purchased or otherwise obtained from various commercial suppliers (e.g. Sigma-Aldrich, VWR, Alfa Aesar) and utilized as received (i.e., without further purification) or as in a form used conventionally in the art.

General Cationic Acrylamide cAM Prepolymer Synthesis

A reaction flask is charged with DI water, diallyldimethylammonium chloride DADMAC, a pH modifier, and chain transfer agent. To the reaction flask two external feeds are connected, one containing acrylamide, the other containing sodium metabisulfite (SMBS) and chain transfer reagent. The reaction mixture is warmed to 35° C., then ammonium persulfate (APS) and sodium bromate are added, followed by starting the feeds. The acrylamide feed is set to be added over 135 minutes, the SMBS feed is set to be added over 195 minutes. During the acrylamide feed, the reaction is gradually heated through an external heating source at ~0.4° C./min up to 90° C. After the conclusion of the acrylamide feed, a second portion of APS is added and the reaction is held at 90° C. for one hour. The amount of DADMAC is varied as necessary to make a prepolymer with the acquired amount of cationic monomer. The molecular weight of the prepolymer is manipulated by increasing or reducing the amount of chain transfer agent as necessary.

Synthesis of cAM Prepolymer 1(PP1)

A four neck round bottomed flask (hereafter denoted the reaction flask) fitted with an overhead stirrer, nitrogen sparger and temperature probe, was charged with DI water and 65% DADMAC (25 g, 0.1 mol), adipic acid (0.277 g, 0.0019 mol), and a 1% solution of sodium hypophosphite (SHP) (1.92 g, 0.00023 mol), followed by sparging with nitrogen and warming to 35° C. with a heating mantle. A single neck roundbottomed flask is charged with 50% acrylamide (97.39 g, 0.68 mol) to which a 40% solution of Trilon-C is added (0.484 g, 0.00038 mol) and is connected to a peristaltic pump (ACM Feed). A trigger solution comprising 1.01% SMBS solution (5.36 g, 0.00028 mol) and 1% SHP solution (1.92 g, 0.00023 mol) is loaded in a 10 mL syringe and put in a syringe pump (Feed 1). Once at 35° C., the reaction flask is charged with a 15% solution of sodium bromate (0.557 g, 0.00055 mol) and a 15% solution of ammonium persulfate (1.46 g, 0.00096 mol), immediately after which the ACM feed (set to 0.75 mL/min) and Feed 1 (set to 2.3 mL/hr) are started. The reaction is then heated at 0.4° C./min for 135 minutes. After the completion of the ACM feed (135 minutes), the nitrogen sparger is removed from the reaction solution and a 15% solution of APS (4.7 g, 0.003 mol) is added initiating the burn out. The temperature is held at 90° C. for one hour, during which time Feed 1 completes. The reaction is then cooled to below 50° C. and transferred to a sample jar.

Parameters and properties of PP1 are set forth in Tables 1 further below.

Synthesis of cAM Prepolymers 2-5(PP2-PP5)

A four neck roundbottomed flask (hereafter denoted the reaction flask) fitted with an overhead stirrer, nitrogen sparger and temperature probe, was charged with DI water and 63.25% DADMAC (35.02 g, 0.137 mol), adipic acid (0.2365 g, 0.0016 mol), and a 1% solution of sodium hypophosphite (SHP) (1.63 g, 0.00015 mol), followed by sparging with nitrogen and warming to 35° C. with a heating mantle. A single neck roundbottomed flask is charged with 48.2% acrylamide (78.44 g, 0.53 mol) to which a 40% solution of Trilon-C (0.4132 g, 0.00033 mol) and DI water (20 g) is added and is connected to a peristaltic pump (ACM Feed). A trigger solution comprising a 1.01% SMBS solution (4.57 g, 0.00024 mol) and 1% SHP solution (1.63 g, 0.00015 mol), is loaded in a 10 mL syringe and put in a syringe pump (Feed 1). Once at 35° C. the reaction flask is charged with a 15% solution of sodium bromate (0.4751 g, 0.00047 mol) and a 15% solution of ammonium persulfate (1.24 g, 0.00082 mol), immediately after which the ACM feed (set to 0.87 mL/min) and Feed 1 are started (set to 1.95 mL/hr). The reaction is then heated by 0.4° C./min for the entirety of the ACM feed. After the completion of the ACM feed (135 minutes), the nitrogen sparger is removed from the reaction solution and a 15% solution of APS (4.96 g, 0.0033 mol) is added initiating the burn out. The temperature is held at 90° C. for one hour, during which time Feed 1 completes. The reaction is then cooled to below 50° C. and transferred to a sample jar. PP2, PP3, and PP5 were made analogously through adjusting the amount of SHP.

Parameters and properties of PP2-PP5 are set forth in Tables 1 further below.

Synthesis of cAM Prepolymer 6 (PP6)

A four neck roundbottomed flask (hereafter denoted the reaction flask) fitted with an overhead stirrer, nitrogen sparger and temperature probe, was charged with DI water and 65% DADMAC (50.01 g, 0.201 mol), and adipic acid (0.2775 g, 0.0019 mol) followed by sparging with nitrogen and warming to 35° C. with a heating mantle. A single neck roundbottomed flask is charged with 48.2% acrylamide (86.17 g, 0.53 mol) to which a 40% solution of Trilon-C (0.4132 g, 0.00033 mol) is added and is connected to a peristaltic pump (ACM Feed). A trigger solution comprising a 1.01% SMBS solution (4.57 g, 0.00024 mol) and 1% SHP solution (1.92 g, 0.00018 mol), is loaded in a 10 mL syringe and put in a syringe pump (Feed 1). Once at 35° C. the reaction flask is charged with a 15% solution of sodium bromate (0.4751 g, 0.00047 mol) and a 15% solution of ammonium persulfate (1.24 g, 0.00082 mol), immediately after which the Acm feed (set to 0.70 mL/min) and Feed 1 are started (set to 2.3 mL/hr). The reaction is then heated by 0.4° C./min for the entirety of the ACM feed. After the completion of the ACM feed (135 minutes), the nitrogen sparger is removed from the reaction solution and a 15% solution of APS (4.96 g, 0.0033 mol) is added initiating the burn out. The temperature is held at 90° C. for one hour, during which time Feed 1 completes. The reaction is then cooled to below 50° C. and transferred to a sample jar.

Parameters and properties of PP6 are set forth in Tables 1 further below.

Comparative Examples 1-4

Comparative Example 1 is a commercially available (pre-formed) gPAM.

Comparative Example 2 is a commercially available on-site gPAM.

Comparative Example 3 is a commercially available PVAM.

Comparative Example 4 is a commercially available PVAM.

Determination of Polymer Properties

The prepolymer RSV is determined at 0.25 dL/g in 1 M ammonium chloride using a PolyVisc.

Determination of gPAM Mw is done using an AF4-MALS.

Zeta potential is determined on a Wyatt Mobius by diluting the samples to 1% in water and adjusting the pH to 7 using dilute NaOH or HCl.

10

TABLE 1

Properties of Prepolymers of Examples 1-12 and Comparative Examples 1-4

| Example | Prepolymer | Cat. Monomer (mol %) | PP RSV (dL/g) |
|---|---|---|---|
| Ex. 1 | PP1 | 12.8 | 1.28 |
| Ex. 2 | PP2 | 20.6 | 1.17 |
| Ex. 3 | PP3 | 20.6 | 1.28 |
| Ex. 4 | PP4 | 20.6 | 1.49 |
| Ex. 5 | PP4 | 20.6 | 1.49 |
| Ex. 6 | PP4 | 20.6 | 1.49 |
| Ex. 7 | PP4 | 20.6 | 1.49 |
| Ex. 8 | PP4 | 20.6 | 1.49 |
| Ex. 9 | PP5 | 20.6 | 1.69 |
| Ex. 10 | PP6 | 25.6 | 1.51 |
| Ex. 11 | PP6 | 25.6 | 1.51 |
| Ex. 12 | PP6 | 25.6 | 1.51 |
| Comp. 1 | — | 15 | — |
| Comp. 2 | — | 12.8 | — |
| Comp. 3 | — | — | — |
| Comp. 4 | — | — | — |

Glyoxalation

A prepolymer (PP) is charged to a reaction flask and diluted with DI water so the concentration of the polymer is as desired, to which is added glyoxal at 15:85 dry w:w ratio relative to the prepolymer. The pH is increased to 10.2 using dilute NaOH and this pH is maintained for the desired reaction time. After which, the reaction is quenched by reducing the pH to 4 with dilute sulfuric acid.

The prepolymer concentration and reaction times of Examples 1-12 are set forth in Table 2 below.

TABLE 2

Parameters of Glyoxalation Reactions of Examples 1-12

| Example | PP Conc. (%) | Reaction Time (s) |
|---|---|---|
| Ex. 1 | 1.7 | 1000 |
| Ex. 2 | 1.7 | 1000 |
| Ex. 3 | 1.7 | 1000 |
| Ex. 4 | 1.7 | 1000 |
| Ex. 5 | 1.7 | 2000 |
| Ex. 6 | 2.0 | 1000 |
| Ex. 7 | 1.9 | 1000 |
| Ex. 8 | 2.1 | 1000 |
| Ex. 9 | 1.7 | 1000 |
| Ex. 10 | 1.7 | 1000 |
| Ex. 11 | 1.7 | 2000 |
| Ex. 12 | 2.0 | 1000 |

The properties of the gPAM Resins were evaluated alongside the polymers of Comparative Examples 1-4, the results of which are shown in Table 3 below.

TABLE 3 gPAM Resins of Examples 1-12 and Resins of Comparative Examples 1-4

| Example | Solids (%) | Mw (MDa) | Rg (nm) | Zeta, pH 7 (mV) | Charge Density (mEq./g) |
|---|---|---|---|---|---|
| Ex. 1 | 1.98 | 10.57 | 176.5 | 16.44 | 1.7 |
| Ex. 2 | 1.98 | 0.859 | 47.6 | | |
| Ex. 3 | 1.97 | 0.9991 | 56.8 | | 2.54 |
| Ex. 4 | 1.97 | 2.114 | 158 | | 2.52 |
| Ex. 5 | 1.97 | 2.267 | 151.1 | | |
| Ex. 6 | 2.33 | 6.38 | 203.7 | 24.86 | 2.57 |
| Ex. 7 | 2.2 | 4.781 | 189.4 | 23.05 | 2.22 |
| Ex. 8 | 2.43 | 16.77 | 316.7 | 25.64 | 2.37 |
| Ex. 9 | 1.97 | 4.84 | 153.8 | | |

TABLE 3-continued

| | gPAM Resins of Examples 1-12 and Resins of Comparative Examples 1-4 | | | | |
|---|---|---|---|---|---|
| Example | Solids (%) | Mw (MDa) | Rg (nm) | Zeta, pH 7 (mV) | Charge Density (mEq./g) |
| Ex. 10 | 1.97 | 1.85 | 102.7 | 24.86 | |
| Ex. 11 | 1.98 | 4.22 | 223.6 | 23.28 | 2.37 |
| Ex. 12 | 2.31 | 7.393 | 235.3 | 25.37 | |
| Comp. 1 | | | | | |
| Comp. 2 | 1.97 | 83.1 | 241 | | |
| Comp. 3 | | | | | |
| Comp. 4 | | | | | |

Drainage Test Methods

A vacuum drainage test (VDT) was performed using a Dynamic Drainage Analyzer (DDA).

VDT-1, VDT-2, VDT-3: American old corrugated container (AOCC) was refined to a CSF of −400 mL and then diluted with DI water to a consistency of 0.9%. To the diluted pulp was added 1100 ppm of calcium chloride, 1230 ppm of sodium sulfate, 1370 ppm of sodium acetate, 800 ppm of calcium acetate and 400 ppm of Indulin-C. The pH of the pulp was adjusted to 7 using concentrated sulfuric acid, followed by the addition of 2.5 wt. % of oxidized starch (GPC D-28F). To perform the test, 750 mL of furnish was charged into the sample receptacle and the pulp was stirred. After 15 seconds of stirring, the polymer additive was charged to the stirring pulp slurry, and the stirring was continued for an additional 10 seconds. The instrument then stops stirring, applies vacuum, and records the amount of time it takes for the pressure to stabilize.

VDT-4: Pulp (AOCC, CSF 410 mL) and white water (pH 6.5, conductivity 2500 uS/cm) were sourced from commercial mill. The concentrated pulp was diluted to a consistency 0.9% using the mill white water. The VDT was then performed as above for VDT-1.

VDT-5: Pulp (AOCC, CSF 410 mL) was sourced from a commercial mil. The pulp was diluted to a consistency of 0.9% using DI water, to which the conductivity was adjusted to −2500 uS/cm using sodium sulfate and the pH was adjusted to 6.5 using concentrated sulfuric acid. The drainage test was then performed as above.

The results of the drainage performance evaluations are set forth in Tables 4-5 below. All values are reported as the % reductions vs. blank.

TABLE 3

| | VDT1-3 Performance of Examples 1-12 and Comparative Examples 1-4 | | | | | |
|---|---|---|---|---|---|---|
| | | | Test: | | | |
| | VDT-1 | VDT-1 | VDT-1 | VDT-2 | VDT-2 | VDT-3 |
| | | | Type: | | | |
| | 3 lb/ ton3 | 6 lb/ ton4 | 9 lb/ ton5 | 3 lb/ ton | 6 lb/ ton | 6 lb/ ton23 |
| Ex. 1 | 9% | 24% | 28% | 20% | 29% | 24% |
| Ex. 1 | 11% | 17% | 12% | | | |
| Ex. 3 | 13% | 21% | 22% | 23% | 28% | |
| Ex. 4 | 14% | 21% | 23% | 17% | 28% | 21% |
| Ex. 5 | | | | 21% | 30% | |
| Ex. 6 | | | | 23% | 34% | 27% |
| Ex. 7 | | | | | | 24% |
| Ex. 8 | | | | | | 28% |
| Ex. 9 | 19% | 31% | 34% | | | |
| Ex. 10 | | | | 21% | 30% | |

TABLE 3-continued

| | VDT1-3 Performance of Examples 1-12 and Comparative Examples 1-4 | | | | | |
|---|---|---|---|---|---|---|
| | | | Test: | | | |
| | VDT-1 | VDT-1 | VDT-1 | VDT-2 | VDT-2 | VDT-3 |
| | | | Type: | | | |
| | 3 lb/ ton3 | 6 lb/ ton4 | 9 lb/ ton5 | 3 lb/ ton | 6 lb/ ton | 6 lb/ ton23 |
| Ex. 11 | | | | 23% | 30% | |
| Ex. 12 | | | | 16% | 31% | |
| Comp. 1 | | | | | | |
| Comp. 2 | | | | 17% | 24% | 12% |
| Comp. 3 | | | | | | |
| Comp. 4 | | | | | | |

TABLE 4

| | VDT-4 & 5 Drainage Performance of Examples 1-12 and Comparative Examples 1-4 | | | |
|---|---|---|---|---|
| | | Test: | | |
| | VDT-4 | VDT-4 | VDT-5 | VDT-5 |
| | | Type: | | |
| | 3 lb/ton2 | 6 lb/ton3 | 3 lb/ton22 | 6 lb/ton33 |
| Ex. 1 | 17% | 22% | 12% | 23% |
| Ex. 1 | | | | |
| Ex. 3 | | | | |
| Ex. 4 | | | | |
| Ex. 5 | | | | |
| Ex. 6 | 22% | 26% | 19% | 31% |
| Ex. 7 | | | | |
| Ex. 8 | | | | |
| Ex. 9 | | | | |
| Ex. 10 | | | | |
| Ex. 11 | | | | |
| Ex. 12 | | | | |
| Comp. 1 | 14% | 15% | 16% | 20% |
| Comp. 2 | 9% | 12% | 5% | 14% |
| Comp. 3 | 3% | | 10% | |
| Comp. 4 | | | 14% | |

As demonstrated in the Example above, prepolymer Mw (approximated by the reduced solution viscosity, RSV) increase (~50%) and charge increased (~80%) do not improvement performance of resulting gPAM resins. However, for prepolymers with similar RSVs but different charges, it is shown that the respective gPAM resins demonstrate Mw of nearly an order of magnitude less. By selectively modifying the glyoxalation conditions to increase the molecular weight of the final gPAM resin, significantly increased drainage performance was obtained. Specifically, drainage performance increased rapidly with Mw, slowing once above 6 MDa.

During the drainage evaluation, it was also observed in various furnishes that the performance increase was especially pronounced in low freeness recycled furnishes containing high levels of anionic trash. Good results were also obtained in unbleached virgin furnishes. Without being bound by theory, it is believed that the potential for high levels of soluble lignin may act as a source of soluble anionics, a condition for which the additive compositions herein demonstrate excellent performance.

In view of the above, the additive composition can be readily envisioned for use in enhancing machine productivity. Additionally, the gPAM resins therein may be used to give good dry strength.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims. Moreover, all combinations of the aforementioned components, compositions, method steps, formulation steps, etc. are hereby expressly contemplated for use herein in various non-limiting embodiments even if such combinations are not expressly described in the same or similar paragraphs.

With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the ranges and subranges enumerated herein sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. An individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims. Lastly, it will be understood that the term "about" with regard to any of the particular numbers and ranges described herein is used to designate values within standard error, equivalent function, efficacy, final loading, etc., as understood by those of skill in the art with relevant conventional techniques and processes for formulation and/or utilizing compounds and compositions such as those described herein. As such, the term "about" may designate a value within 10, alternatively within 5, alternatively within 1, alternatively within 0.5, alternatively within 0.1, % of the enumerated value or range.

While the present disclosure has been described with respect to particular embodiments thereof, it is apparent that numerous other forms and modifications will be obvious to those skilled in the art. The appended claims and this disclosure generally should be construed to cover all such obvious forms and modifications, which are within the true scope of the present disclosure.

What is claimed is:

1. An additive composition for papermaking, comprising:
an aqueous media; and
a glyoxalated polyacrylamide (gPAM) resin having a weight average molecular weight (Mw) of at least about 5 MDa,
wherein the gPAM resin is present in an amount of from about 1.2 to about 6% solids, based on the aqueous media.

2. The additive composition of claim 1, wherein the gPAM resin has:
(i) a zeta potential of from about 10 to about 30 mV, at pH 7;
(ii) a radius of gyration (Rg) of at least about 100 nm;
(iii) a charge density of from about 0.2 to about 3 mEq./g, at pH 7; or
(iv) any combination of (i)-(iii).

3. The additive composition of claim 1, wherein the glyoxalated polyacrylamide resin comprises the reaction product of (A) a cationic acrylamide (cAM) prepolymer and (B) glyoxal in an aqueous media, and wherein:
(i) the cAM prepolymer (A) is present in the aqueous media at an initial concentration of from about 0.9 to about 5.7%;
(ii) the cAM prepolymer (A) and the glyoxal (B) are reacted in a dry weight (w/w) ratio of from about 75:25 to about 95:5 (A): (B); or
(iii) both (i) and (ii).

4. The additive composition of claim 3, wherein the cAM prepolymer (A) has:
(i) a reduced solution viscosity (RSV) of from about 0.5 to about 1.8 dL/g;
(ii) a zeta potential of from about 10 to about 30 mV, at pH 7;
(iii) a charge density of from about 0.2 to about 3 mEq./g, at pH 7; or
(iv) any combination of (i)-(iii).

5. The additive composition of claim 3, wherein the gPAM resin has a zeta potential within about 10% of the zeta potential of the cAM prepolymer (A).

6. The additive composition of claim 3, wherein the gPAM resin has a charge density within about 10% of the charge density of the cAM prepolymer (A).

7. The additive composition of claim 3, wherein the cAM prepolymer (A) comprises the reaction product of:
(A1) an acrylamide (AM) monomer;
(A2) a cationic monomer; and
optionally, (A3) one or more additional ethylenically unsaturated monomer(s);
wherein the cAM prepolymer (A) comprises from about 2 to about 30 mol % of cationic monomer units derived from the cationic monomer (A2).

15

8. The additive composition of claim 7, wherein the AM monomer (A1), the cationic monomer (A2), and optionally the additional ethylenically unsaturated monomer(s) (A3) are reacted in the presence of a chain transfer agent.

9. The additive composition of claim 7, wherein:

(i) the AM monomer (A1) comprises acrylamide;

(ii) the cationic monomer (A2) comprises diallyldimethylammonium chloride (DADMAC);

(iii) the one or more additional ethylenically unsaturated monomer(s) (A3), when present, are selected from styrenes, alkyl acrylates, and vinyl acetates; or (iv) any combination of (i)-(iii).

10. The additive composition of claim 1, wherein the gPAM resin has:

(i) a zeta potential of from about 10 to about 30 mV, at pH 7;

(ii) a radius of gyration (Rg) of at least about 100 nm;

(iii) a charge density of from about 0.2 to about 3 mEq./g, at pH 7; or (iv) any combination of (i)-(iii);

wherein the gPAM resin comprises the reaction product of (A) a cationic acrylamide (cAM) prepolymer and (B) glyoxal in an aqueous media, wherein:

(i) the cAM prepolymer (A) is present in the aqueous media at an initial concentration of from about 0.9 to about 5.7%;

(ii) the cAM prepolymer (A) and the glyoxal (B) are reacted in a dry weight (w/w) ratio of from about 75:25 to about 95:5 (A):(B); or (iii) both (i) and (ii);

wherein the cAM prepolymer (A) has:

(i) a reduced solution viscosity (RSV) of from about 0.5 to about 1.8 dL/g;

(ii) a zeta potential of from about 10 to about 30 mV, at pH 7;

(iii) a charge density of from about 0.2 to about 3 mEq./g, at pH 7; or (iv) any combination of (i)-(iii).

wherein the cAM prepolymer (A) comprises the reaction product of:

(A1) an acrylamide (AM) monomer comprising acrylamide;

(A2) a cationic monomer comprising diallyldimethylammonium chloride (DADMAC); and optionally, (A3) one or more additional ethylenically unsaturated monomer(s) chosen from styrenes, alkyl acrylates, and vinyl acetates; and wherein the cAM prepolymer (A) comprises from about 2 to about 30 mol % of cationic monomer units derived from diallyldimethylammonium chloride (DADMAC).

11. A method of preparing a drainage-optimized additive composition for papermaking, comprising:

I) preparing a cationic acrylamide (cAM) prepolymer having at least one predetermined physical property selected from cationic monomer content, reduced solution viscosity (RSV), charge density, and zeta potential; and II) selectively glyoxalating the cAM prepolymer by controlling the concentration of the cAM prepolymer in an aqueous media during glyoxalation to give a glyoxalated polyacrylamide (gPAM) resin having a weight average molecular weight (Mw) of at least about 5 MDa, thereby preparing the additive composition, wherein (II) selectively glyoxalating the cAM prep comprises reacting the cAM prepolymer (A) and the glyoxal (B) in an aqueous media and wherein:

(i) the cAM prepolymer (A) is present in the aqueous media at an initial concentration of from about 0.9 to about 5.7%;

(ii) the cAM prepolymer (A) and the glyoxal (B) are reacted in a dry weight (w/w) ratio of from about 75:25 to about 95:5 (A):(B); or (iii) both (i) and (ii), and wherein selectively glyoxalating the CAM prepolymer gives the glyoxalated polyacrylamide (gPAM) resin in the aqueous media at a solids content (%) of about X+0.3, where X is the initial concentration of the cAM. polymer (A) in the aqu cous media.

12. The method of claim 11, wherein the at least one predetermined physical property of the cAM prepolymer (A) is selected from:

(i) a cationic monomer content of from 2 to about 30 mol %;

(ii) a reduced solution viscosity (RSV) of from about 0.5 to about 1.8 dL/g;

(iii) a charge density of from about 0.2 to about 3 mEq./g, at pH 7;

(iv) a zeta potential of from about 10 to about 30 mV, at pH 7; or (v) any combination of (i)-(iv).

13. The method of claim 11, further comprising preparing the cAM prepolymer (A), wherein preparing the cAM prepolymer (A) comprises reacting (A1) an acrylamide (AM) monomer, (A2) a cationic monomer, and optionally (A3) one or more additional ethylenically unsaturated monomer(s) in the presence of a chain transfer agent.

14. The method of claim 13, wherein the cAM prepolymer (A) comprises from about 2 to about 30 mol % of cationic monomer units derived from the cationic monomer (A2).

15. The method of claim 13, wherein:

(i) the AM monomer (A1) comprises acrylamide;

(ii) the cationic monomer (A2) comprises diallyldimethylammonium chloride (DADMAC);

(iii) the one or more additional ethylenically unsaturated monomer(s) (A3), when present, are selected from styrenes, alkyl acrylates, and vinyl acetates; or (iv) any combination of (i)-(iii).

16. A process of forming paper, said process comprising:

(1) providing an aqueous suspension of cellulosic fibers;

(2) combining an additive composition comprising a glyoxalated polyacrylamide (gPAM) resin prepared in-situ with the aqueous suspension, wherein the additive composition is the additive composition of claim 1;

(3) forming the cellulosic fibers into a sheet; and (4) drying the sheet to produce a paper.

17. The process of claim 16, wherein the gPAM resin is prepared in-situ within about 5 hours of combining the additive composition with the aqueous suspension.

18. The process of claim 16, wherein a drainage rate exhibited during forming the cellulosic fibers into the sheet and/or drying the sheet to produce the paper is reduced by at least about 20%, compared to a substantially similar process that is substantially free from the additive composition.

19. A method of preparing a drainage-optimized additive composition for papermaking, comprising:

I) preparing a cationic acrylamide (cAM) prepolymer having at least one predetermined physical property selected from cationic monomer content, reduced solution viscosity (RSV), charge density, and zeta potential; and II) selectively glyoxalating the cAM prepolymer by controlling the concentration of the cAM prepolymer in an aqueous media during glyoxalation to give a glyoxalated polyacrylamide (gPAM) resin having a weight average molecular weight (Mw) of at least about 5 MDa, thereby preparing the additive composition, wherein:

(i) the gPAM resin has a zeta potential within about 10% of the zeta potential of the cAM prepolymer (A);

(ii) the gPAM resin has a charge density within about 10 of the charge density of the cAM prepolymer (A); or (iii) both (i) and (ii).

20. A method of preparing a drainage-optimized additive composition for papermaking, comprising:

I) preparing a cationic acrylamide (cAM) prepolymer having at least one predetermined physical property selected from cationic monomer content, reduced solution viscosity (RSV), charge density, and zeta potential; and II) selectively glyoxalating the cAM prepolymer by controlling the concentration of the cAM prepolymer in an aqueous media during glyoxalation to give a glyoxalated polyacrylamide (gPAM) resin having a weight average molecular weight (Mw) of at least about 5 MDa, thereby preparing the additive composition, wherein the gPAM resin is present in an amount of from about 1.2 to about 6% solids, based on the aqueous media.

* * * * *